US011955134B2

(12) United States Patent
Amid et al.

(10) Patent No.: US 11,955,134 B2
(45) Date of Patent: Apr. 9, 2024

(54) PHRASE EXTRACTION FOR ASR MODELS

(71) Applicant: Google LLC, Mountain View, CA (US)

(72) Inventors: Ehsan Amid, Mountain View, CA (US); Om Thakkar, Freemont, CA (US); Rajiv Mathews, Mountain View, CA (US); Francoise Beaufays, Mountain View, CA (US)

(73) Assignee: Google LLC, Mountain View, CA (US)

( * ) Notice: Subject to any disclaimer, the term of this patent is extended or adjusted under 35 U.S.C. 154(b) by 298 days.

(21) Appl. No.: 17/643,848

(22) Filed: Dec. 13, 2021

(65) Prior Publication Data

US 2023/0178094 A1   Jun. 8, 2023

Related U.S. Application Data

(60) Provisional application No. 63/264,836, filed on Dec. 2, 2021.

(51) Int. Cl.
G10L 21/0332 (2013.01)
G10L 15/06 (2013.01)
G10L 15/08 (2006.01)
G10L 21/10 (2013.01)

(52) U.S. Cl.
CPC ........ G10L 21/0332 (2013.01); G10L 15/063 (2013.01); G10L 15/08 (2013.01); G10L 21/10 (2013.01)

(58) Field of Classification Search
CPC ....... H04K 3/90; H04K 2203/12; H04K 3/825
See application file for complete search history.

(56) References Cited

U.S. PATENT DOCUMENTS

| 9,123,343 B2 | 9/2015 | Kurki-Suonio | |
| 11,538,467 B1* | 12/2022 | Feyisetan | G10L 15/1815 |
| 2015/0287401 A1 | 10/2015 | Lee et al. | |
| 2017/0139905 A1 | 5/2017 | Na | |
| 2020/0034663 A1* | 1/2020 | Michiels | G06F 11/10 |

(Continued)

OTHER PUBLICATIONS

Shah et al. "Evaluating the vulnerability of end-to-end automatic speech recognition models to membership inference attacks". Interspeech 2021, Aug. 30-Sep. 3, 2021, Brno, Czech Republic (Year: 2021).*

(Continued)

Primary Examiner — Jesse S Pullias
(74) Attorney, Agent, or Firm — Honigman LLP; Brett A. Krueger; Grant Griffith

(57) ABSTRACT

A method of phrase extraction for ASR models includes obtaining audio data characterizing an utterance and a corresponding ground-truth transcription of the utterance and modifying the audio data to obfuscate a particular phrase recited in the utterance. The method also includes processing, using a trained ASR model, the modified audio data to generate a predicted transcription of the utterance, and determining whether the predicted transcription includes the particular phrase by comparing the predicted transcription of the utterance to the ground-truth transcription of the utterance. When the predicted transcription includes the particular phrase, the method includes generating an output indicating that the trained ASR model leaked the particular phrase from a training data set used to train the ASR model.

22 Claims, 5 Drawing Sheets

(56) References Cited

U.S. PATENT DOCUMENTS

2020/0082259 A1* 3/2020 Gu .......................... G06N 3/08
2021/0064760 A1* 3/2021 Sharma ................ G06F 21/577
2021/0357508 A1* 11/2021 Elovici ............... G06F 11/3684

OTHER PUBLICATIONS

Khanna et al. "Identifying Privacy Vulnerabilities in Key Stages of Computer Vision, Natural Language Processing, and Voice Processing Systems". International Journal of Business Intelligence and Big Data Analytics, pp. 1-11, Published Jan. 5, 2021 (Year: 2021).*
Tseng et al. "Membership Inference Attacks Against Self-supervised Speech Models". arXiv:2111.05113v1 [cs.CR] Nov. 9, 2021 (Year: 2021).*

* cited by examiner

PHRASE EXTRACTION FOR ASR MODELS

CROSS REFERENCE TO RELATED APPLICATIONS

This U.S. patent application claims priority under 35 U.S.C. § 119(e) to U.S. Provisional Application 63/264,836, filed on Dec. 2, 2021. The disclosure of this prior application is considered part of the disclosure of this application and is hereby incorporated by reference in its entirety.

TECHNICAL FIELD

This disclosure relates to a phrase extraction mechanism for ASR models.

BACKGROUND

Automatic speech recognition (ASR) models receive audio data as an input and generate a transcription as an output, e.g., a predicted transcription, based on the received audio data input. ASR models are trained on training data including audio data with corresponding transcriptions. However, ASR models may leak the training data it has memorized during training. This data leakage of private and/or sensitive training data is generally undesirable. However, testing the robustness of an ASR model to detect the leakage of training data can be challenging.

SUMMARY

One aspect of the disclosure provides a computer-implemented method of phrase extraction for automatic speech recognition (ASR) models. The computer-implemented method when executed on data processing hardware causes the data processing hardware to perform operations that include obtaining audio data characterizing an utterance and a corresponding ground-truth transcription of the utterance and modifying the audio data to obfuscate a particular phrase recited in the utterance. The operations also include processing, using a trained ASR model, the modified audio data to generate a predicted transcription of the utterance, and determining whether the predicted transcription includes the particular phrase by comparing the predicted transcription of the utterance to the ground-truth transcription of the utterance. When the predicted transcription includes the particular phrase, the operations include generating an output indicating that the trained ASR model leaked the particular phrase from a training data set used to train the ASR model.

Implementations of the disclosure may include one or more of the following optional features. In some implementations, the operations further include, when the predicted transcription includes another phrase substituted for the particular phrase from the ground-truth transcription that is associated with a same category of information as the particular phrase, generating an output indicating that the trained ASR model leaked the other phrase from the training data set used to train the ASR model. In some examples, the operations further include, when the predicted transcription does not include the particular phrase or another phrase substituted for the particular phrase from the ground-truth transcription that is associated with a same category of information as the particular phrase, generating an output indicating that the trained ASR model has not leaked any information from the training data set used to train the ASR model.

In some implementations, the audio data includes an audio waveform. In these implementations, the audio waveform may correspond to human speech. Alternatively, the audio waveform may conform to synthesized speech.

In some examples, modifying the audio data includes identifying a segment of the audio data that aligns with the particular phrase in the ground-truth transcription based on the ground-truth transcription, and performing data augmentation on the identified segment of the audio data to obfuscate the particular phrase recited in the utterance. In these examples, performing data augmentation on the identified segment of the audio data may include adding noise to the identified segment of the audio data. Alternatively, performing data augmentation on the identified segment of the audio data may include replacing the identified segment of the audio data with noise.

In some implementations, the operations further include processing the ground-truth transcription of the utterance to identify any phrases included in the ground-truth transcription that are associated with a specific category of information. Here, modifying the audio data occurs in response to identifying that the particular phrase included in the ground-truth transcription is associated with the specific category of information. In these implementations, the specific category of information may include names, addresses, dates, zip codes, patient diagnosis, account numbers, or telephone numbers.

Another aspect of the disclosure provides a system of phrase extraction for ASR models. The system includes data processing hardware and memory hardware in communication with the data processing hardware. The memory hardware stores instructions that when executed on the data processing hardware causes the date processing hardware to perform operations including obtaining audio data characterizing an utterance and a corresponding ground-truth transcription of the utterance and modifying the audio data to obfuscate a particular phrase recited in the utterance. The operations also include processing, using a trained ASR model, the modified audio data to generate a predicted transcription of the utterance, and determining whether the predicted transcription includes the particular phrase by comparing the predicted transcription of the utterance to the ground-truth transcription of the utterance. When the predicted transcription includes the particular phrase, the operations include generating an output indicating that the trained ASR model leaked the particular phrase from a training data set used to train the ASR model.

This aspect may include one or more of the following optional features. In some implementations, the operations further include, when the predicted transcription includes another phrase substituted for the particular phrase from the ground-truth transcription that is associated with a same category of information as the particular phrase, generating an output indicating that the trained ASR model leaked the other phrase from the training data set used to train the ASR model. In some examples, the operations further include, when the predicted transcription does not include the particular phrase or another phrase substituted for the particular phrase from the ground-truth transcription that is associated with a same category of information as the particular phrase, generating an output indicating that the trained ASR model has not leaked any information from the training data set used to train the ASR model.

In some implementations, the audio data comprises an audio waveform. In these implementations, the audio waveform may correspond to human speech. Alternatively, the audio waveform may conform to synthesized speech.

In some examples, modifying the audio data includes identifying a segment of the audio data that aligns with the particular phrase in the ground-truth transcription based on the ground-truth transcription, and performing data augmentation on the identified segment of the audio data to obfuscate the particular phrase recited in the utterance. In these examples, performing data augmentation on the identified segment of the audio data may include adding noise to the identified segment of the audio data. Alternatively, performing data augmentation on the identified segment of the audio data may include replacing the identified segment of the audio data with noise.

In some implementations, the operations further include processing the ground-truth transcription of the utterance to identify any phrases included in the ground-truth transcription that are associated with a specific category of information. Here, modifying the audio data occurs in response to identifying that the particular phrase included in the ground-truth transcription is associated with the specific category of information. In these implementations, the specific category of information may include names, addresses, dates, zip codes, patient diagnosis, account numbers, or telephone numbers.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Implementations herein are directed toward a phrase extraction mechanism for use in detecting leakage of training data used to train an automated speech recognition (ASR) model. Identifying phrases of a speech utterance to replace or mask with noisy audio data and analyzing the output of the trained ASR model to determine whether the trained ASR model output the true transcription of the utterance demonstrates whether a leakage of training data from the trained ASR model has occurred. The phrase extraction mechanism can be used to test whether various types of sensitive information in a speech waveform, such as address, zip code, patient diagnosis, etc. are leaked from a trained ASR model.

Figure 1:
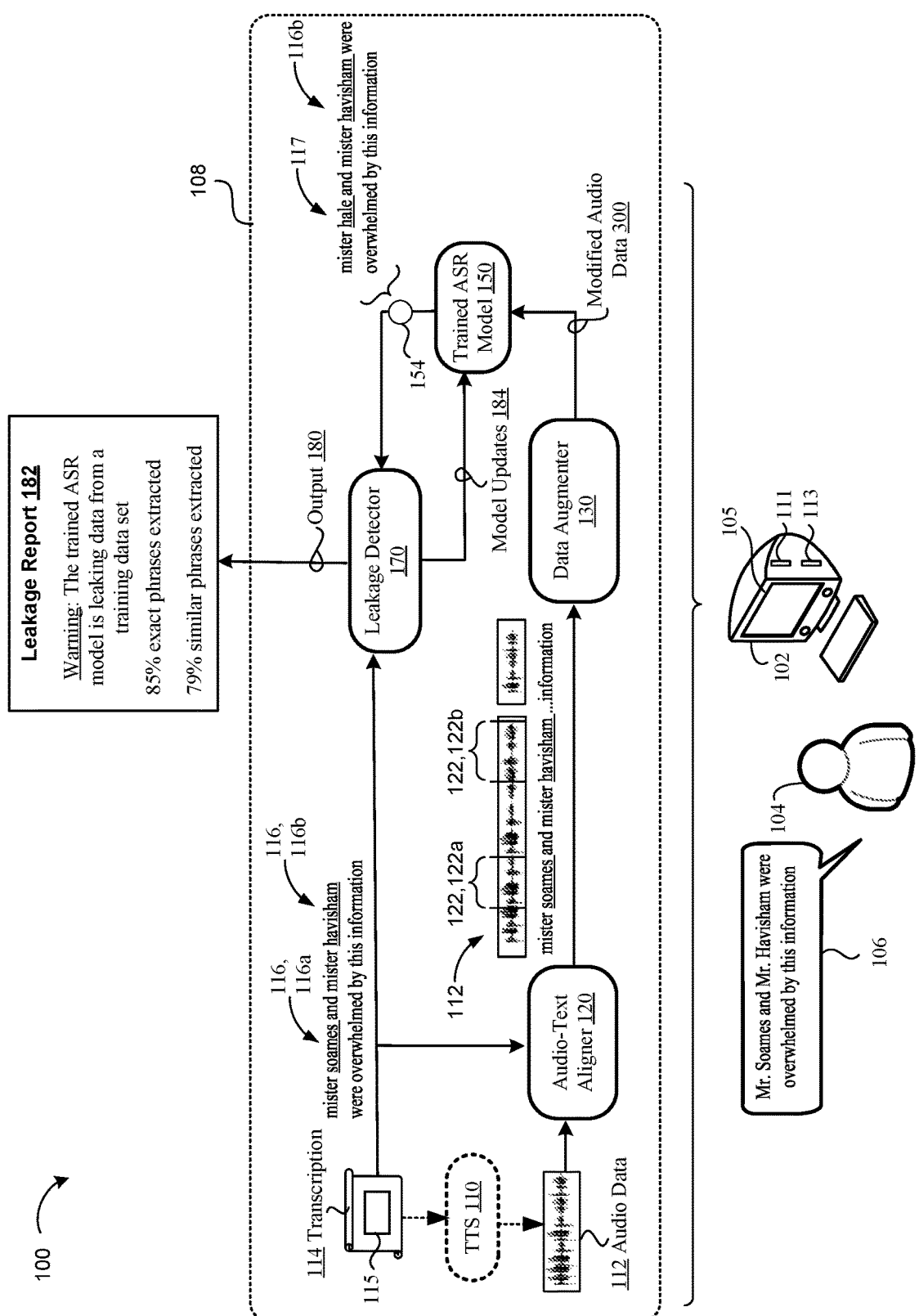
FIG. 1 is a schematic view of an example for a phrase extraction mechanism for automatic speech recognition (ASR) models.

FIG. 1 is an example of a speech environment including a system 100 having a phrase extraction mechanism 108 executing on a computing device 102. The computing device 102 (also referred to generally as a device 102) is configured to capture sounds (e.g., audio data) from one or more users 104 within the speech environment. Here, the audio data 112 may refer to a spoken utterance 106 by the user 104 that functions as a test utterance for a trained ASR model 150 to recognize. Speech-enabled systems of the device 102, such as the trained ASR model 150, may perform speech recognition on the audio data 112 to generate a transcription 154 of a corresponding utterance 106 spoken by the user 104.

The computing device 102 includes data processing hardware 111 and memory hardware 113 in communication with the data processing hardware 111 and storing instructions, that when executed by the data processing hardware 111, cause the data processing hardware 111 to perform one or more operations. The computing device 102 could include a distributed system (cloud computing environment). The computing device 102 also includes a display 105 and/or is in communication with one or more displays. The display 105 may display a leakage report 182 indicating whether or not the trained ASR model 150 is leaking potentially sensitive data from a training data set 210 (FIG. 2) used to train the ASR model 150. The computing device 102 may include an audio system with an audio capture device (e.g., microphone) for capturing and converting spoken utterances 106 within the speech environment 100 into electrical signals and a speech output device (e.g., a speaker) for communicating an audible audio signal (e.g., as output audio data from the device 102). The ASR model 150 and/or a leakage detector 170 may execute on the computing device 102 as the audio-text aligner 120 and the data augmenter 130, or the ASR model 150 and/or the leakage detector 170 may execute on other computing devices in communication with the computing device 102.

As described in greater detail below, the leakage detector 170 may check, or verify the robustness of the model 150 by determining whether the model 150 still recognizes particular phrases 116 from the utterance 106 that were replaced with noise in modified audio data 300 by a data augmenter 130, and output an indication 180 indicating whether the model 150 leaked the one or more particular phrases 116 from the training data set 210 used to train the model 150. For instance, the leakage detector 170 may output an indication 180 indicating that the model 150 leaked potentially sensitive rare training data memorized by the model 150 during training. FIG. 1 depicts the computing device 102 capturing audio data 112 including an audio waveform of human speech characterizing the utterance 106 "Mr. Soames and Mr. Havisham were overwhelmed by this information" spoken by the user 104. Optionally, the user 104 may input a textual representation/transcription 114 of the utterance 106 and a text-to-speech (TTS) system 110 may convert the transcription 114 into the audio data 112 that includes an audio waveform of synthesized speech characterizing the utterance 106.

In some implementations, the leakage detector 170 determines whether the model 150 leaked the one or more particular phrases 116 from the training data set 210 used to train the model 150 without receiving audio data 112 corresponding to the one or more particular phrases 116. In other words, the audio data 112 including the audio waveform of human or synthesized speech may only include other terms/phrases from the ground-truth transcription 114 while omitting the one or more particular phrases 116. In these implementations, for a transcription 114 only containing one particular phrase 116 to be omitted, the audio data 112 is broken into two segments where the first segment terminates at a start boundary of where the particular phrase 116 would be located and the second audio segment commences at an end boundary of where the particular phrase 116 would be located. The data augmenter 130 may produce modified audio data 300 by generating a masked/augmented audio segment 302 (FIG. 3) associated with a duration of time of noise and combining the two audio segments of audio data 112 with the masked/augmented audio segment 302 inserted there between. Accordingly, the leakage detector 170 may compare the modified audio data 300 and the ground-truth transcription 112 (including the particular phrase 116) to check whether the model 150 is leaking any of the particular phrases 116 or similar phrases 117 of varied length from the training data set 210 used to train the ASR model 150.

For example, rather than providing the transcription 114 "I know Mr. Havisham has this information" to the TTS system 110 for conversion into audio data 112 corresponding to synthesized speech, the transcription 114 may be broken into the segments "I know Mr." and "has this information" that omits the particular phrase 116 "Havisham" for input to the TTS system 110. The ground-truth transcription 114 input to the leakage detector 170 would still include the particular phrase 116 "Havisham". When the TTS system 110 converts the two segments of the transcription 114 into corresponding synthesized speech segments of audio data 112, the data augmenter 130 may generate a corresponding masked audio segment 302 and combine the two synthesized speech segments/phrases with the masked audio segment 302 disposed there between to produce the modified audio data 300. Here, the masked audio segment 302 may include a noisy audio segment having a duration of time associated with the particular phrase 116 "Havisham". Notably, the data augmenter 130 may also vary the duration of time of the augmented/masked audio segment 302 in attempts to determine if the ASR model 150 leaks similar phrases 117 (e.g., other character names such as Hale if the duration is shortened). Likewise, when the audio data 112 corresponds to human speech spoken by the user 104, the user 104 may simply speak two phrases "I know mister" and "has this information." In this scenario, the user 104 could provide some input indicating that the data augmenter 130 should generate the corresponding masked audio segment 302 for insertion between the two spoken phrases to produce the modified audio data 300.

As will become apparent, whether the audio data 112 includes the audio waveform of human or synthesized speech, the transcription 114 of the utterance 106 will also serve as a corresponding ground-truth transcription 114 of the utterance 106 for comparison with a predicted transcription 154 output by the trained ASR model 150 based on speech recognition performed on the modified audio data 300 obfuscating/masking the particular phrases 116a, 116b "Soames" and "Havisham" from the original input utterance 106. The ground-truth transcription 114 includes the one or more particular phrases 116 along with other the terms/phrases and corresponding time information 115 associated with the audio data 112. The particular phrases 116 include phrases to be augmented/replaced with noise so that they are obfuscated, or otherwise not recognizable, in the modified audio data 300. In some examples, the user 104 provides an input to the computing device 102 explicitly identifying the particular phrases 116 to be obfuscated. In other examples, the phrase extraction mechanism 108 identifies the particular phrases included in the transcription 114 that are associated with a specific category of information. In these examples, the user 104 may provide inputs indicating one or more specific categories of information and the phrase extraction mechanism 108 may process the ground-truth transcription 114 to identify any phrases associated with the specific categories of information. Accordingly, the particular phrases 116 may be identified based on an explicit user input indicating selection of the phrases 116 or the particular phrases 116 may be identified as being associated with a specific category of information. As used herein, a phrase may include one or more terms such as name (e.g., Havisham or John Smith), a city (e.g., New Haven), a sequence of numbers in a ZIP code (e.g., 4-8-3-0-4), an address (e.g., 1234 Lavender Ln), a date of birth (e.g., Jan. 1, 2000), etc. The time information 115 may include time stamps for start/end boundaries of each word/term in the transcription 114. In other words, the time information 115 defines boundaries where each word/term starts and stops in the transcription 114. In some implementations, where the transcription 114 is paired with corresponding audio data and derived from the training data set 210 used to train the model 150, the time information 115 may be obtained via annotated time stamps during training and stored with the training data set 210. Alternatively, where the transcription 114 is provided to the TTS system 110 for conversion into audio data 112 corresponding to synthesized speech, the TTS system 110 may generate the time information 115 when performing text-to-speech conversion on the transcription 114.

The phrase extraction mechanism 108 further includes an audio-text aligner 120 configured to receive the audio data 112 and the transcription 114 including the one or more phrases 116 and the corresponding time information 115, and identify one or more segments 122 in the audio data 112 that align with the one or more particular phrases 116 identified in the transcription 114. In other words, the audio-text aligner 120 receives the transcription 114 including the time information 115, and uses the time information 115 to identify a segment 122 of the audio data 112 that aligns with the particular phrase 116 in the transcription 114, and outputs the audio data 112 including each identified segment 122. More specifically, the audio-text aligner 120 receives the transcription 114 including corresponding time information 115, where the transcription 114 includes "mister soames and mister havisham were overwhelmed by this information". Here, "soames" is a particular phrase 116a and "havisham" is also a particular phrase 116b. The identified particular phrases 116a, 116b may belong to the same category of information 212 (FIG. 2) (e.g., character names) within the training data set 210. The audio-text aligner 120 uses the time information 115 to align the transcription 114 with the audio data 112 so that the audio-text aligner 120 can identify the segments 122a, 122b in the audio data 112 that convey the particular phrases 116a, 116b. In this example, the audio-text aligner 120 identifies segment 122a in the audio data 122 that aligns with the particular phrase "soames" 116a in the transcription 114, and also identifies segment 122b in the audio data 122 that aligns with the particular phrase "havisham" 116b in the transcription 114. Once the audio-text aligner 120 identifies the segments 122a, 122b in the audio data 112 that align with the particular phrases 116a, 116b, the audio data 112 including the identified segments 122a, 122b are provided to the data augmenter 130 for augmenting the audio data 112 to generate the modified audio data 300.

The data augmenter 130 receives the audio data 112 including the one or more identified segments 122 corresponding to the one or more particular phrases 116 (e.g., from the audio-text aligner 120) and performs data augmentation on each identified segment 122 of the audio data 112 to obfuscate the corresponding particular phrase 116 in the audio data 112 characterizing the utterance 106. That is, the data augmenter 130 receives the audio data 112 and, based on the identified segment 122 corresponding to the particular phrase 116, augments the audio data 112 to generate the modified audio data 300 including an augmented audio segment 302 (FIG. 3) which obfuscates the particular phrase 116. In some implementations, the data augmenter 130 modifies the audio data 112 using data augmentation techniques to distort each identified segment 122 that aligns with a corresponding identified particular phrase 116. Examples herein refer to the data augmenter 130 modifying the audio data 112 by adding noise of a duration corresponding to the length of the identified segment 122. Other data augmentation techniques may be applied in addition to or in lieu of noise.

After the data augmenter 130 modifies the audio data 112 by obfuscating the particular phrase 116 in the identified segment 122 to generate the modified audio data 300, the model 150 receives the modified audio data 300 and, using the modified audio data 300, generates, as output, the corresponding predicted transcription 154 of the modified audio data 300. That is, the model 150 receives the modified audio data 300, and, based on the modified audio data 300, generates the predicted transcription 154 of the modified audio data 300. The leakage detector 170 receives, as input, the predicted transcription 154 of the modified audio data 300 and the ground-truth transcription 114, and generates, as output, the indication 180 indicating whether the trained ASR model 300 leaked any of the particular phrases 116 or similar phrases 117 from the training data set 210 used to train the ASR model 150. That is, the leakage detector 170 compares the predicted transcription 154 of the modified audio data 300 to the ground-truth transcription 114 of the utterance 106 to determine whether the predicted transcription 154 includes the identified particular phrases 116 that were replaced with noise in the modified audio data 300. In the example shown, the output indication 180 would indicate that the exact particular phrase 116b "havisham" was extracted from the modified audio data 300 despite the modified audio data 300 augmenting the corresponding audio segment 122b with noise. When the leakage detector 170 determines that the predicted transcription 154 does not include the particular phrase 116 or another similar phrase 117 substituted for the particular phrase 116 from the transcription 114 that is associated with a same category of information 212 as the particular phrase 116, the leakage detector 170 generates an output 180 indicating that the model 150 has not leaked any particular phrases 116 from the category of information 212 from the training data set 210 used to train the model 150.

In some examples, the predicted transcription 154 includes another phrase 117 associated with a same category of information 212 (FIG. 2) as the particular phrase 116 from the transcription 114. For example, the category of information 212 may include character names, addresses, zip codes, dates of birth, patient diagnosis, or any other category of information 212 that refers to a type of training data set 210 used to train the model 150. In these examples, the leakage detector 170 generates an output 180 indicating that the model 150 leaked the other phrase 117 from the training data set 210 used to train the model 150. In the example shown, the output indication 180 would indicate that a similar phrase 117 "hale" was extracted from the modified audio data 300 at the location of the corresponding audio segment 122a augmented with noise to obfuscate the particular phrase 116a "soames". Here, "hale" and "soames" both correspond to character names from an audio book used to train the ASR model 300, and the ASR model 150 recognizing the phrase "hale" reveals that the trained ASR model 150 is leaking data from the training data set 210 by substituting the similar phrase 117 "hale" for the particular phrase 116a "soames".

In some examples, the output 180 includes a leakage report 182 for review by the user 104. For instance, the leakage report 182 may be displayed on a display/screen 105 of the user device 102 or another display device associated with the user 104. The user device 102 may execute a user interface generator configured to present a representation of the leakage report 182 to the user 104 of the user device 102. The leakage report 182 may include a notification/warning when leaks are detected, or a notification that the model 150 has not leaked information from the training data set 210. In some examples, the leakage report 182 includes an aggregate of outputs 180 from multiple audio data 112 and transcription 114 pairs to provide a percentage of particular phrases extracted (e.g., exact particular phrases 116 or other similar phrases 117 substituted for the particular phrase 116 and associated with the same category of information 212), and thus, are leaked by the model 150. The leakage report 180 may also indicate that the trained ASR model 150 is leaking data from the training data set 210 associated with some specific categories of information 212 but not others. For instance, leakage report 182 could indicate detected leaks in the category of information 212 related to names/proper nouns but no detected leaks in other categories of information 212 related date of birth, account numbers, etc. In these scenarios, the indication in the leakage report 182 indicating that the ASR model 150 is leaking data from some categories of information 212 and not others can be based on categories of information associated with the particular phrases 116 identified to be replaced with noise from multiple audio data 112 and transcription 114 pairs input to the phrase extraction model 108.

In some implementations, when the leakage detector 170 determines that the model 150 has leaked particular phrases 116 and/or similar phrases 117 included in the category of information 212 from the training data set 210 used to train the model 150, the leakage detector 170 additionally generates model updates 184 for the model 150 to improve the security/privacy of the model 150. That is, the model updates 184 may update the model 150 so that it no longer leaks data (e.g., particular phrases 116 or similar phrases 117). In these implementations, the ASR system 108 may be automated, whereby the leakage detector 170 automatically provides the model updates 184 to the model 150. The model updates 184 may include parameters that cause the model 150 to output symbols "#####" or just blank spaces in future predicted transcriptions 154 where the identified segment 122 of audio data 112 that aligns with the particular phrase 116 occurs so that the particular phrase 116 is not in the predicted transcription 154 output by the model 150. Additionally or alternatively, the model updates 184 may be included in the leakage report 182 to convey steps for the user 102 to undertake to improve the security of the model 150.

Figure 3:
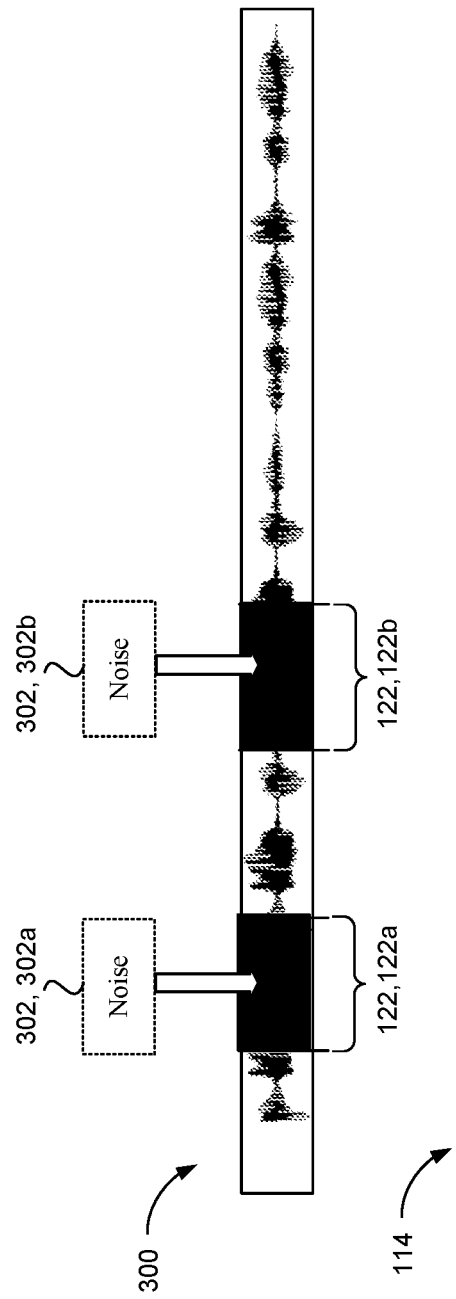
FIG. 3 is a schematic view of an example phrase extraction for one or more particular phrases in a transcription.

Referring briefly to FIG. 3, the data augmenter 130 obfuscates the particular phrases 116a, 116b recited in the utterance 106 by performing data augmentation on the identified segments 122a, 122b in the audio data 112 to generate corresponding masked segments 302. As used herein, "masked segments" and "augmented segments" may be used interchangeably. The data augmenter 130 may perform data augmentation by adding noise to the identified segments 122a, 122b of the audio data 112. In some examples, the data augmenter 130 concatenates the identified segments 122a, 122b in the audio data 112 with noisy audio segments to produce augmented audio segments 302a, 302b which include both the audio data 112 and the added noisy audio segments. In other examples, the data augmenter 130 generates the augmented audio segments 302a, 302b by replacing the audio data 112 in the identified segments 122a, 122b with noisy audio segments. In other words, the data augmenter 130 removes the audio data 112 occurring in the identified segments 122a, 122b, and inserts a corresponding noisy audio segment to generate the augmented audio segments 302a, 302b in the modified audio data 300.

In some implementations, to limit overflow of the particular phrases 116a, 116b in the identified segments 122a, 122b into the remainder of the audio data 112, the data augmenter 130 includes padding in the augmented audio segments 302a, 302b. The padding may be an amount of time (e.g., 100 milliseconds) to separate the identified segments 122a, 122b from the remainder of the audio data 112. In these implementations, the padding is added before and after each of the identified segments 122a, 122b. Once the padding has been added to the identified segments 122a, 122b, the data augmenter 130 performs data augmentation on the padding and the identified segments 122a, 122b to generate the augmented audio segments 302a, 302b in the modified audio data 300.

Referring back to FIG. 1, the modified audio data 300 including the augmented audio segments 302a, 302b obfuscating the identified segments 122a, 122b is provided to the model 150 which, in turn generates the predicted transcription 154 of "mister hale and mister havisham were overwhelmed by this information." In this example, the predicted transcription 154 includes the particular phrase 116b "havisham," and another phrase 117 "hale" substituted for the particular phrase 116a "soames" from the transcription 114. The other phrase 117 "hale" is associated with the same category of information 212 as the particular phrase 116a "soames," where both the other phrase 117 and the particular phrase 116a are associated with the same category of information 212 (e.g., character names) in the training data set 210 used to train the model 150.

The leakage detector 170 compares the predicted transcription 154, including the other phrase 117 and the particular phrase 116b, and the ground-truth transcription 114, including the identified particular phrases 116a, 116b, to determine whether or not the trained TTS model 150 leaked the particular phrase 116b and the other phrase 117 from the training data set 210 used to train the model 150. Here, the leakage detector 170 may determine that the particular phrase 116b includes an exact match extracted from the modified audio data. The leakage detector 170 may further determine that while the other phrase 117 "hale" is not an exact match for the particular phrase 116a "soames", the other phrase 117 corresponds to a similar phrase since "hale" and "soames" are both associated with the same category of information (e.g., character names) in the training data set 210 (e.g., an audio book) used to train the ASR model 150. In response to determining that the model 150 leaked the particular phrase 116b and the other phrase 117, the leakage detector 170 generates the output 180 indicating that the model 150 leaked the particular phrase 116b and the other phrase 117 from the training data set 210 used to train the model 150.

The output 180 from the leakage detector 170 may further include, or be used to compile, the leakage report 182 conveying "Warning: The trained ASR model is leaking data from a training data set." The warning may occur when a threshold number of particular phrases or similar phrases are extracted from audio data 112 characterizing multiple test utterances. In the example shown, leakage report 182 further conveys the aggregate of one or more previous outputs 180 including the particular phrases 116 leaked as "85% exact phrases extracted" and the aggregate of one or more previous outputs 180 including the other phrases 117 leaked as "79% similar phrases extracted." As discussed above, the leakage report 182 may be displayed on a screen 105 of the user device 102 to notify the user 104 of the user device 102 that a leak has or has not been detected. The leakage detector 170 may further provide model updates 184 to the model 150 to improve the security/privacy of the model 150 and prevent further leakage of information from the training data set 210 used to train the model 150. The model 150 may use the model updates 184 to update the model 150 automatically and/or the model updates 184 may include user instructions/suggestions for updating the model 150 to prevent data leaks from the training data set 210.

Figure 2:
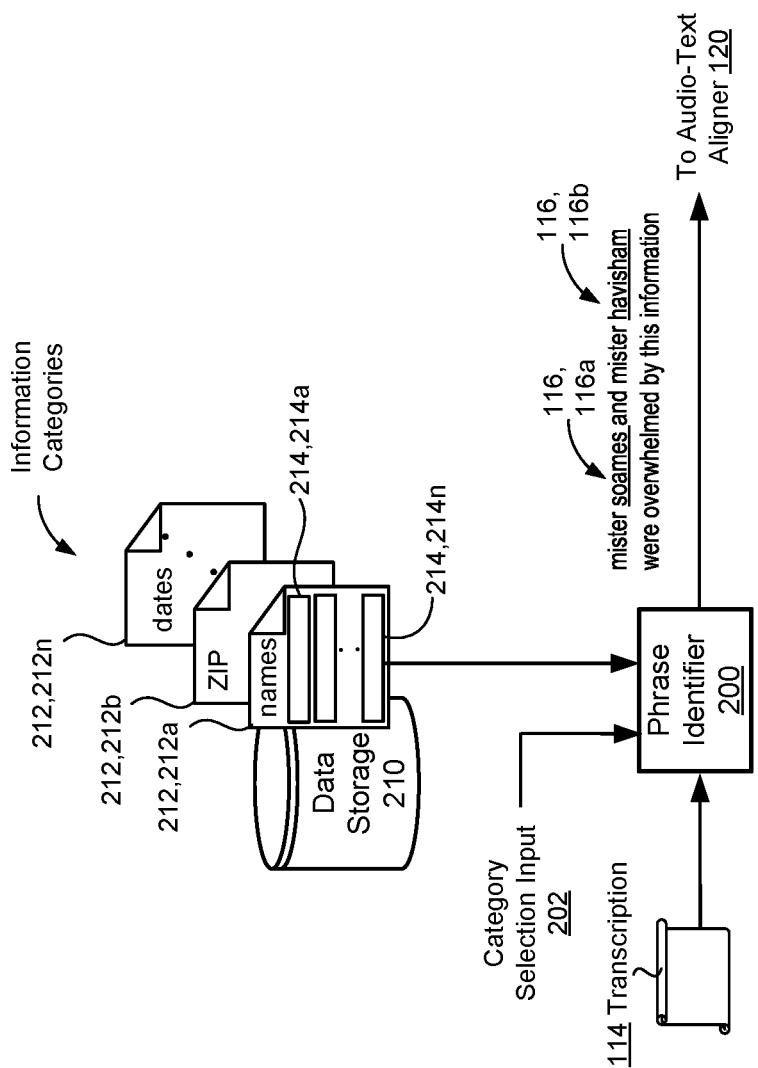
FIG. 2 is a schematic view of an example phrase identifier for identifying one or more particular phrases in a transcription.

Referring to FIG. 2, the phrase extraction mechanism 108 may include a phrase identifier 200, which allows the user 102 to select a specific category of information 212 of the training data set 210 for the phrase identifier 200 to identify in the utterance 106. In some examples, the user 102 provides a category selection input 202 corresponding to a category of information 212 in the training data set 210 used to train the model 150. In other examples, the user 102 identifies the particular phrases 116 in the transcription 114 to obfuscate in the modified audio data 300. For instance, the transcription 114 may be displayed on the screen 105 and the user 102 could provide a user input indication to identify the particular phrases 116 to obfuscate in the modified audio data 300.

Each category of information 212 in the training data set 210 may include one or more example phrases 214, 214a—n corresponding to the category of information 212. When the user 102 provides the category selection input 202 to the phrase identifier 200, the phrase identifier 200 may process the transcription 114 to identify example phrases 214 corresponding to the category of information 212 that are present in the transcription 114. The phrase identifier 200 outputs these identified example phrases 214 as the identified particular phrases 116 in the transcription 114. In other words, the user 102 inputs the category selection input 202 for the phrase identifier 200 to identify particular phrases 116 in the utterance 106 belonging to the category 212 associated with the category selection input 202. For instance, the category of information 212 may correspond to character names from an audio book used to train the ASR model 150. Here, the example phrases 214 may include a list of all the character names (e.g., soames, havisham, hale, etc.) that occur in the training data set 210

As shown in FIG. 2, the category selection input 202 and the corresponding ground-truth transcription 114 are provided to the phrase identifier 200, and in response, the phrase identifier 200 determines whether the ground-truth transcription 114 of the utterance 106 includes any particular phrases 116 associated with the category of information 212 specified by the category selection input 202. In this example, the category selection input 202 specifies the specific category of information 212a of names (e.g., "look for character names"). The category of information 212a of names includes example phrases 214a-n, which may include "soames," "hale," and "havisham." The phrase identifier 200 processes the category of information 212a including example phrases 214a—n and the transcription 114 and automatically determines that the transcription 114 includes the particular phrases 116a, 116b of "soames" and "havisham," which belong to the specific category of information 212a input as the category selection input 202. The phrase identifier 200 then provides the transcription 114 to the audio-text aligner 120 for modification. In other words, the audio-text aligner 120 and the data augmenter 130 modify the audio data 112 in response to the phrase identifier 200 identifying that the particular phrases 116a, 116b are included in the transcription 114 associated with the specific category of information 212a of names. This example is illustrative only and is not intended to limit the scope of the categories of information 212. The categories of information 212 may include any category that characterizes the training data set 210, such as names, addresses, dates, zip codes, patient diagnosis, account numbers, or telephone numbers.

Figure 4:
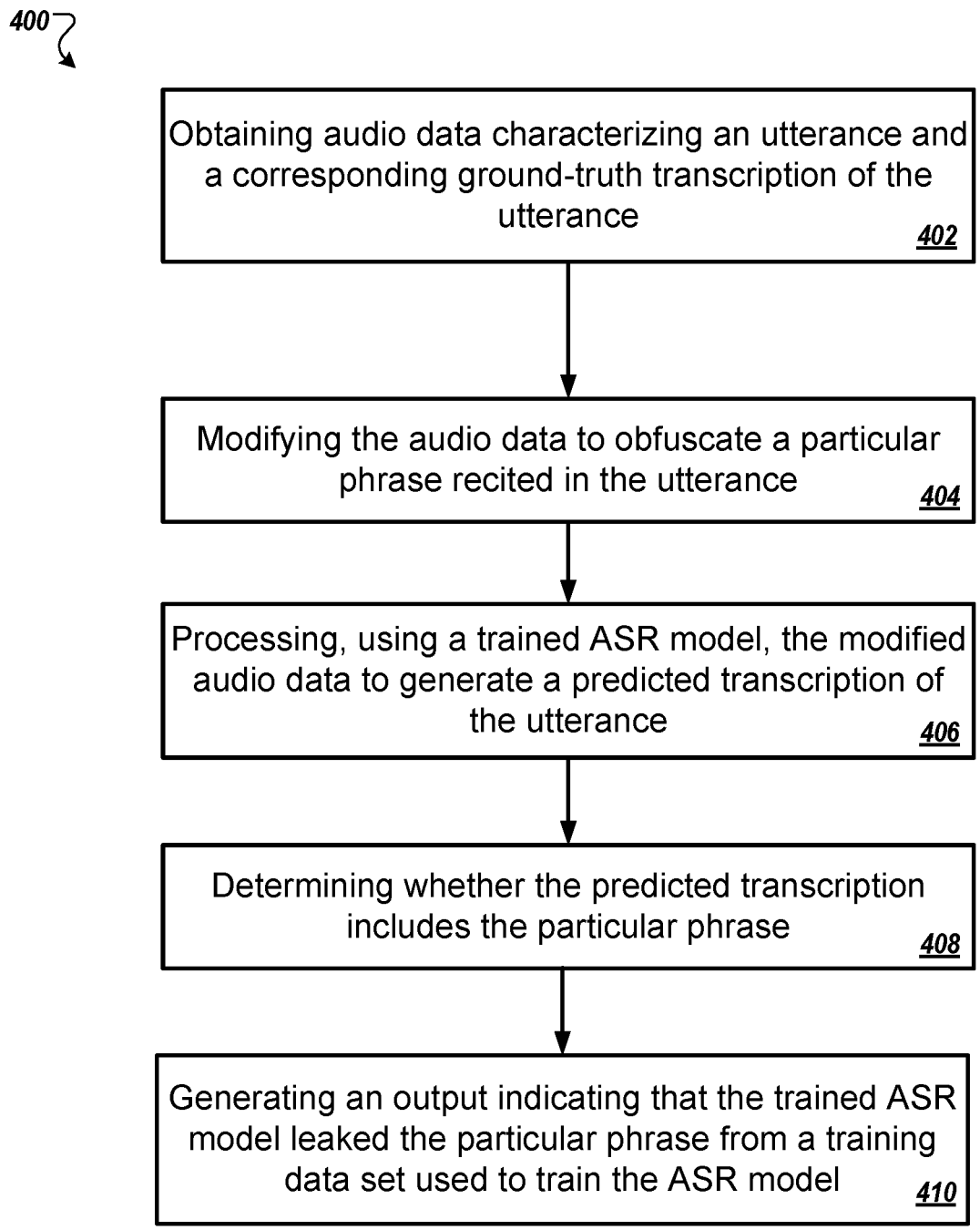
FIG. 4 is a flowchart of an example arrangement of operations for a method of implementing a phrase extraction mechanism for ASR models.

FIG. 4 is a flowchart of an exemplary arrangement of operations for a method 400 of phrase extraction for ASR models. The method 400 includes, at operation 402, obtaining audio data 112 characterizing an utterance 106 and a corresponding ground-truth transcription 114 of the utterance 106. At operation 404, the method 400 includes modifying the audio data 112 to obfuscate a particular phrase 116 recited in the utterance 106.

At operation 406, the method 400 also includes processing, using a trained ASR model 150, the modified audio data 300 to generate a predicted transcription 154 of the utterance 106. The method 400 further includes, at operation 408, determining whether the predicted transcription 154 includes the particular phrase 116 by comparing the predicted transcription 154 of the utterance 106 to the ground-truth transcription 114 of the utterance 106. At operation 410, the method 400 also includes, when the predicted transcription 154 includes the particular phrase 116, generating an output 180 indicating that the trained ASR model 150 leaked the particular phrase 116 from a training data set 210 used to train the ASR model 150.

Figure 5:
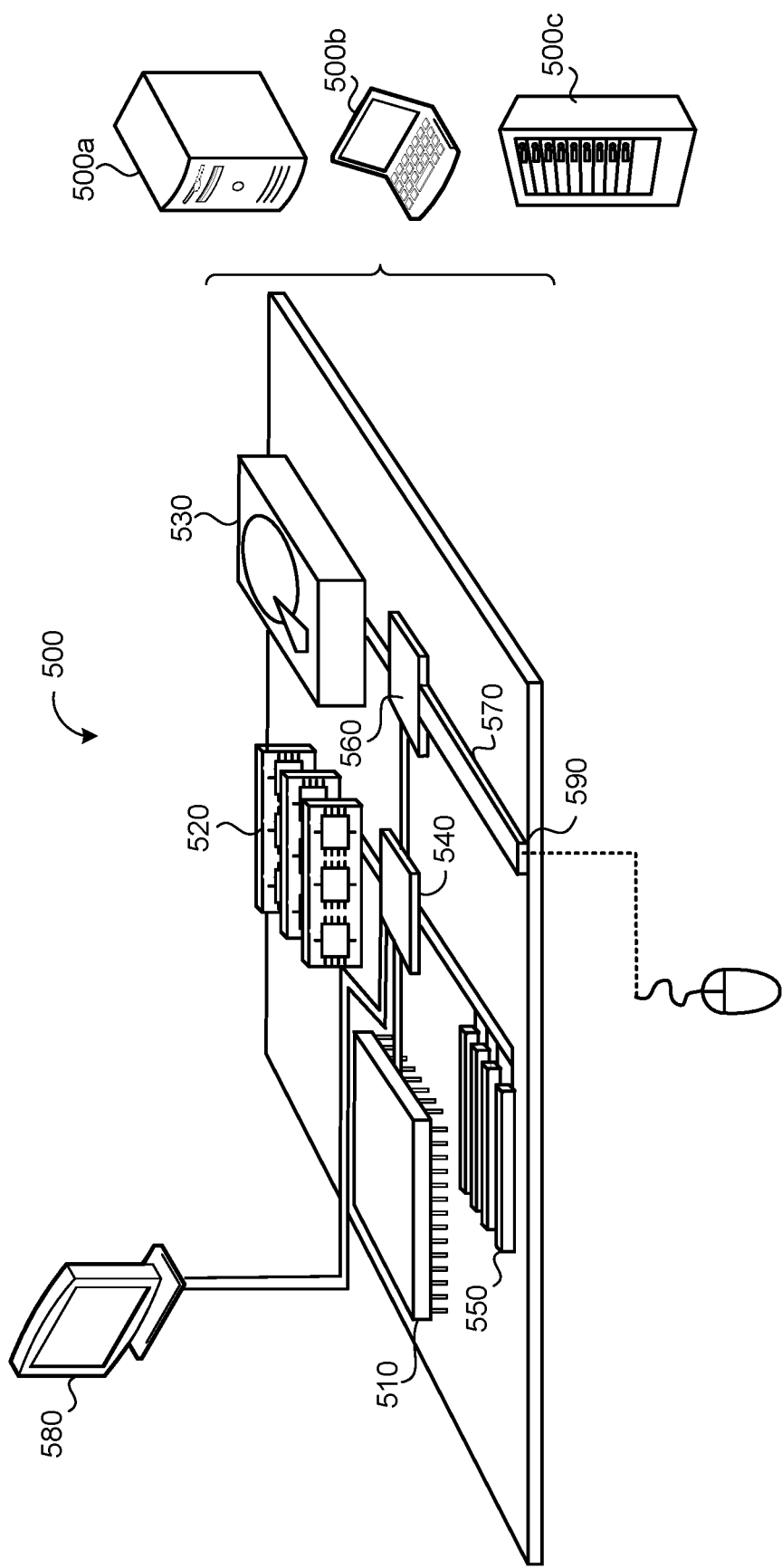
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 (e.g., data processing hardware 111 of FIG. 1) can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 (e.g., memory hardware 113 of FIG. 1) stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
    obtaining audio data characterizing an utterance and a corresponding ground-truth transcription of the utterance;
    modifying the audio data to obfuscate a particular phrase recited in the utterance;
    processing, using a trained automated speech recognition (ASR) model, the modified audio data to generate a predicted transcription of the utterance;
    determining whether the predicted transcription includes the particular phrase by comparing the predicted transcription of the utterance to the ground-truth transcription of the utterance; and
    when the predicted transcription includes the particular phrase, generating an output indicating that the trained ASR model leaked the particular phrase from a training data set used to train the ASR model.

2. The computer-implemented method of claim 1, wherein the operations further comprise, when the predicted transcription includes another phrase substituted for the particular phrase from the ground-truth transcription that is associated with a same category of information as the particular phrase, generating an output indicating that the trained ASR model leaked the other phrase from the training data set used to train the ASR model.

3. The computer-implemented method of claim 1, wherein the operations further comprise, when the predicted transcription does not include the particular phrase or another phrase substituted for the particular phrase from the ground-truth transcription that is associated with a same category of information as the particular phrase, generating an output indicating that the trained ASR model has not leaked any information from the training data set used to train the ASR model.

4. The computer-implemented method of claim 1, wherein the audio data comprises an audio waveform.

5. The computer-implemented method of claim 4, wherein the audio waveform corresponds to human speech.

6. The computer-implemented method of claim 4, wherein the audio waveform corresponds to synthesized speech.

7. The computer-implemented method of claim 1, wherein modifying the audio data comprises:
    based on the ground-truth transcription, identifying a segment of the audio data that aligns with the particular phrase in the ground-truth transcription; and
    performing data augmentation on the identified segment of the audio data to obfuscate the particular phrase recited in the utterance.

8. The computer-implemented method of claim 7, wherein performing data augmentation on the identified segment of the audio data comprises adding noise to the identified segment of the audio data.

9. The computer-implemented method of claim 7, wherein performing data augmentation on the identified segment of the audio data comprises replacing the identified segment of the audio data with noise.

10. The computer-implemented method of claim 1, wherein the operations further comprise:
processing the ground-truth transcription of the utterance to identify any phrases included in the ground-truth transcription that are associated with a specific category of information,
wherein modifying the audio data occurs in response to identifying that the particular phrase included in the ground-truth transcription is associated with the specific category of information.

11. The computer-implemented method of claim 10, wherein the specific category of information comprises names, addresses, dates, zip codes, patient diagnosis, account numbers, or telephone numbers.

12. A system comprising:
data processing hardware; and
memory hardware in communication with the data processing hardware, the memory hardware storing instructions that when executed on the data processing hardware cause the data processing hardware to perform operations comprising:
obtaining audio data characterizing an utterance and a corresponding ground-truth transcription of the utterance;
modifying the audio data to obfuscate a particular phrase recited in the utterance;
processing, using a trained automated speech recognition (ASR) model, the modified audio data to generate a predicted transcription of the utterance;
determining whether the predicted transcription includes the particular phrase by comparing the predicted transcription of the utterance to the ground-truth transcription of the utterance; and
when the predicted transcription includes the particular phrase, generating an output indicating that the trained ASR model leaked the particular phrase from a training data set used to train the ASR model.

13. The system of claim 12, wherein the operations further comprise, when the predicted transcription includes another phrase substituted for the particular phrase from the ground-truth transcription that is associated with a same category of information as the particular phrase, generating an output indicating that the trained ASR model leaked the other phrase from the training data set used to train the ASR model.

14. The system of claim 12, wherein the operations further comprise, when the predicted transcription does not include the particular phrase or another phrase substituted for the particular phrase from the ground-truth transcription that is associated with a same category of information as the particular phrase, generating an output indicating that the trained ASR model has not leaked any information from the training data set used to train the ASR model.

15. The system of claim 12, wherein the audio data comprises an audio waveform.

16. The system of claim 15, wherein the audio waveform corresponds to human speech.

17. The system of claim 15, wherein the audio waveform corresponds to synthesized speech.

18. The system claim 12, wherein modifying the audio data comprises:
based on the ground-truth transcription, identifying a segment of the audio data that aligns with the particular phrase in the ground-truth transcription; and
performing data augmentation on the identified segment of the audio data to obfuscate the particular phrase recited in the utterance.

19. The system of claim 18, wherein performing data augmentation on the identified segment of the audio data comprises adding noise to the identified segment of the audio data.

20. The system of claim 18, wherein performing data augmentation on the identified segment of the audio data comprises replacing the identified segment of the audio data with noise.

21. The system of claim 12, wherein the operations further comprise:
processing the ground-truth transcription of the utterance to identify any phrases included in the ground-truth transcription that are associated with a specific category of information,
wherein modifying the audio data occurs in response to identifying that the particular phrase included in the ground-truth transcription is associated with the specific category of information.

22. The system of claim 21, wherein the specific category of information comprises names, addresses, dates, zip codes, patient diagnosis, account numbers, or telephone numbers.

* * * * *